Figure 1:
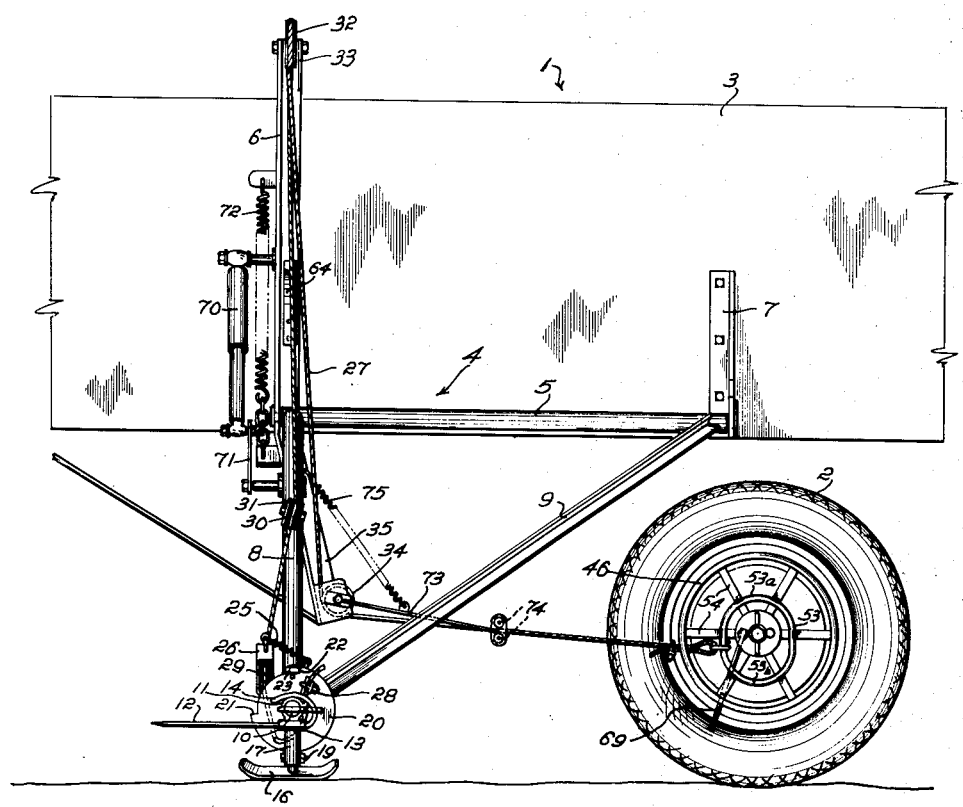

Aug. 30, 1955    C. H. GODDARD    2,716,503
SELF LOADING VEHICLE APPARATUS
Filed Dec. 27, 1954    3 Sheets-Sheet 1

INVENTOR.
Cecil H. Goddard
BY Alex. E. MacRae
Attorney.

Aug. 30, 1955   C. H. GODDARD   2,716,503
SELF LOADING VEHICLE APPARATUS
Filed Dec. 27, 1954   3 Sheets-Sheet 2
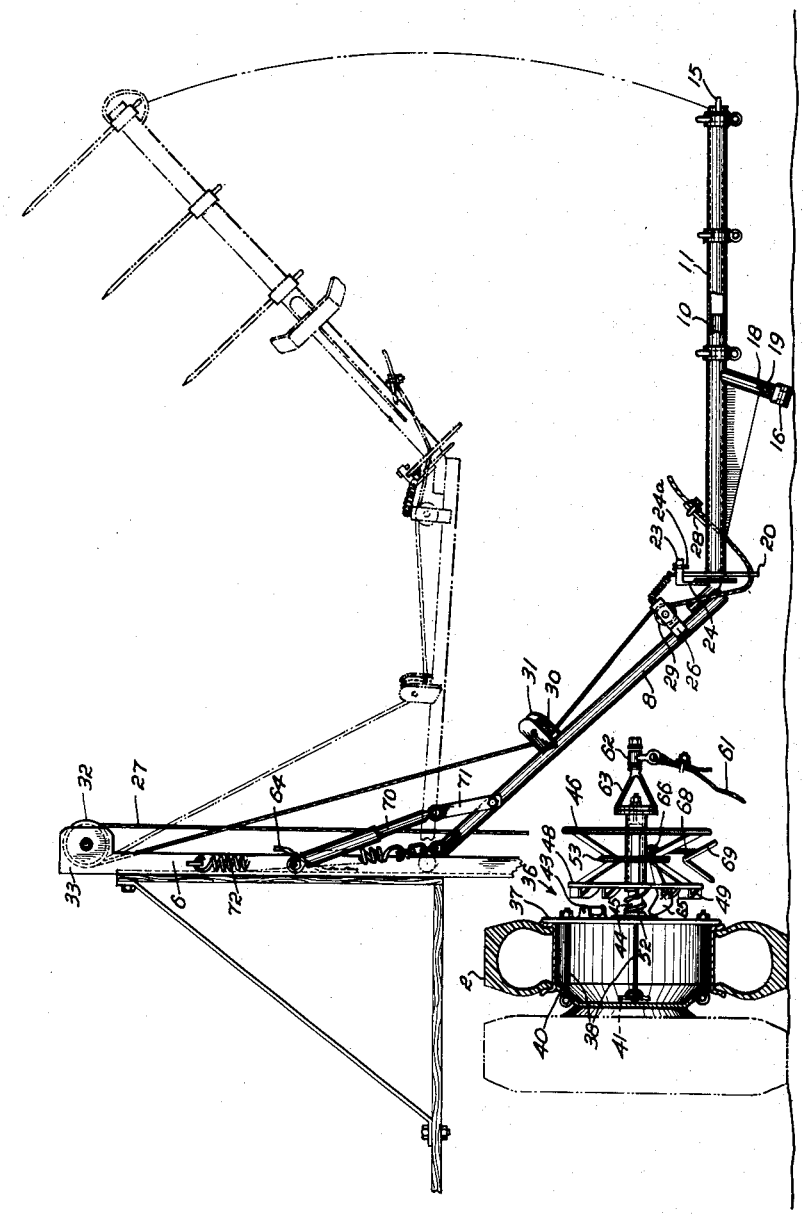
INVENTOR.
Cecil H. Goddard
BY Alex. E. MacRae
Attorney.

Aug. 30, 1955  C. H. GODDARD  2,716,503
SELF LOADING VEHICLE APPARATUS
Filed Dec. 27, 1954  3 Sheets-Sheet 3
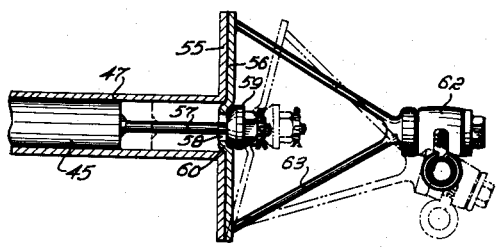
Fig. 4.
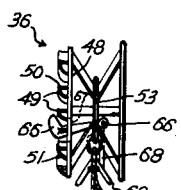
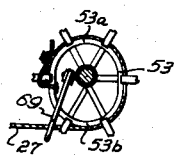
Fig. 5.
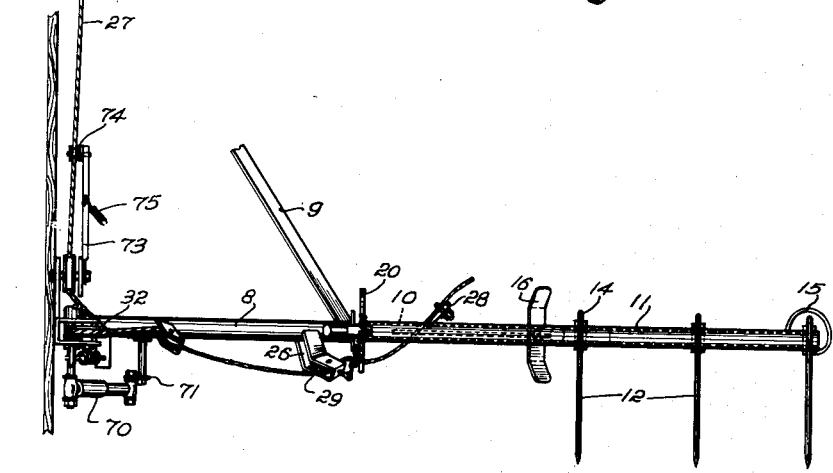
Fig. 3.
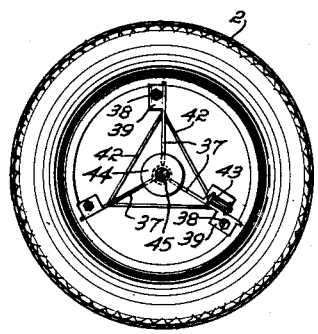
Fig. 6.
INVENTOR.
Cecil H. Goddard
BY
Alex. E. MacRae
Attorney.

United States Patent Office 2,716,503
Patented Aug. 30, 1955

2,716,503

SELF LOADING VEHICLE APPARATUS

Cecil H. Goddard, Expanse, Saskatchewan, Canada

Application December 27, 1954, Serial No. 477,751

4 Claims. (Cl. 214—359)

This invention relates to a loading apparatus for bales of hay and the like.

An object of the invention is to provide a loading apparatus which is of simplified construction, which is convenient to operate, and which is effective and satisfactory in operation.

The invention includes the provision, in combination with a transporting vehicle, of a frame, arranged to be swingably mounted on the vehicle, fork means pivotally carried by the frame, mechanism for rotating the fork means from material engaging to material carrying position, mechanism for swinging the frame and fork means when the latter is in material carrying position, actuating means utilizing a driving member of the vehicle for rotating the fork means and swinging the frame, and a clutch interposed between the actuating means and the driving member.

The invention will be described with reference to the accompanying drawings, in which Figure 1 is a side elevation of the loading apparatus as applied to a transporting truck, Figure 2 is an end elevation of the apparatus, Figure 3 is a partial plan view of the apparatus, Figure 4 is a side elevation, partly in section, of a portion of the clutch member, Figure 5 is a side elevation of a portion of the actuating means, and Figure 6 is a side elevation of the wheel mounting for the actuating means.

In the drawings, the transporting vehicle or truck is partially indicated at 1, it being understood that such vehicle is to be utilized for collecting a plurality of articles, such as bales of hay or the like scattered over the surface of a field, and to transport such articles to a desired place of storage. The vehicle includes a driving wheel 2 and a load-receiving box 3.

The loading apparatus of the present invention comprises a frame 4, which may be triangular in shape as shown, having a rod 5 rotatably mounted on the box 3 as by means of bars 6 and 7 fixed to the box. It will be observed that rod 5 extends longitudinally of the box adjacent the exterior lower portion thereof. The frame 4 also includes an arm 8 fixed to one end of rod 5 and extending right angularly therefrom, and a brace arm 9 having one end fixed to the other end of rod 5 and its other end fixed to the free end portion of arm 8.

Also fixed to the free end portion of arm 8 and extending therefrom in aligned angular relation therewith is a shaft 10 on which a sleeve 11 is rotatably mounted. Fixed to the sleeve 11 are a plurality of prongs 12 extending laterally and substantially right angularly therefrom. It will be apparent that the sleeve 11 and prongs 12 constitute a rotatably mounted fork. The prongs 12 may be formed of spring steel and each may be conveniently attached to the sleeve by providing a tubular bracket 13 on the sleeve through which the prong extends and by providing an integral hooked end 14 on the prong which may be sprung over the sleeve to secure the prong in place thereon. A curved guard rod 15 on the outer prong to extend over the end of sleeve 11 and to prevent fouling of baler twine on the outer corner of the fork.

The work is provided with a ground riding shoe 16 which is carried by a bracket 17 depending from sleeve 11 at a point slightly inwardly of the inner prong. The shoe may be adjustable as to height by providing slots or additional holes 18 in the bracket for reception of the retaining bolt 19. As shown, the shoe is inwardly inclined towards the vehicle to prevent outward bending movement thereof.

It will be observed that, with the shoe 16 riding on the ground, the arms 8 and 9 are downwardly inclined and the work is in a generally horizontal position, the prongs thus being in a position to engage bales resting upon the ground.

Means will now be described for (1) rotating the fork to place its prongs and the load carried thereby in an upwardly extending position and (2) for swinging the arms 8 and 9 and fork carried thereby upwardly into load-disengaging position.

A disc 20 is attached, as by welding, to the inner end of sleeve 11, such disc having a peripheral recess forming a pair of shoulders 21 and 22. The shoulders constitute stops for engagement by a lug 23 projecting through the recess and carried by an arm 24 fixed to shaft 10. A pin 24a depending from lug 23 serves to retain the rotating fork assembly on shaft 10. A spring 25, having one end connected to disc 20 and the other end connected to a bracket 26 fixed to arm 8, normally holds lug 23 in engagement with stop 22. It will be observed that, in the latter position, the fork is held in horizontal position as previously described. It will also be observed that, when the fork is rotated against the action of spring 25 to place lug 23 in engagement with stop 21, the fork will be in upwardly extending position.

Actuating means for rotating the fork against the action of spring 25 comprises a cable 27 having one end portion extending through the disc 20 and secured to a bracket 28 on sleeve 11. The cable extends over a pulley 29 carried by bracket 26, and thence over a pulley 30 carried by bracket 31 fixed to arm 8. The cable then extends over a pulley 32 carried by bracket 33 fixed to bar 6 at a point somewhat above the top of box 3. The cable then extends in a reverse direction and over a pulley 34 carried by an arm 35 fixed to bar 6 and depending below the box 3. The cable then extends rearwardly towards the driving wheel 2 where its other end is connected to a clutch mechanism generally indicated at 36, Figure 2.

The clutch mechanism comprises a mounting bracket having a plurality (three as shown) of radially directed arms 37. The outer ends of arms 37 are arranged to bear upon the rim of wheel 2, as shown, to which the arms are secured as by means of bolts 38 which extend through flanges 39 carried by the outer ends of arms 37 and conventional openings 40 in the wheel disc. For convenience of attachment, the bolts 38 may be eye-bolts, as shown, each having a cross pin 41 extending through the eye. Thus, the pin and eye head may be readily hooked through the opening 40, and the bolt and arms tightened in place. The arms are preferably provided with cross-braces 42. One of the flanges 39 carries a protruding clutch member such as a clutch roller 43. The converging ends of arms 37 are fixed as by welding to an axial disc 44 and an axial shaft 45 which extends outwardly from the wheel.

A reel 46 having a hub 47 (see Figure 4) is rotatably and reciprocably mounted on shaft 45. The reel has a rear disc 48, on the rear face of which are mounted a plurality of clutch lugs 49 in circumferentially arranged relation. Each lug 49 has a right angular face 50 and an inclined face 51. A spring 52, interposed between discs 44 and 48 normally holds disc 48 with its lugs 49 and reel 46 in non-engaging relation with clutch roller 43. The reel includes a central oval ring 53 eccentrically supported by means of spoke straps 54. As shown in Figure 1, the end of cable 27 is secured to the ring 53 for reeling thereupon. As also shown in Figure 1, in the ground engaging position of shoe 16 and horizontal position of the fork, the portion 53a of ring 53 above the axis of shaft 45 is substantially semi-circular and equi-distantly spaced from the axis of shaft 45, while the portion 53b below the axis of the shaft is spaced from such axis a gradually increasing distance towards the lowermost part of the ring. It will thus be apparent that on anti-clockwise rotation of the ring and reel, the cable will be wound thereon, the initial winding movement on portion 53a being relatively slow and the following winding movement on portion 53b being relatively fast.

Means for reciprocating the reel against the action of spring 52 to place clutch roller 43 in engagement with a lug 49 comprises a disc 55 fixed to the outer end of hub 47, and a second disc 56 normally held in seating engagement on disc 55 by means of an axial rod 57 fixed to the end of shaft 45 and extending through an opening 58 in disc 56. The rod 57 carries a bushing 59 which seats in a recessed portion 60 of disc 56 extending peripherally about the opening 58. An actuating rope 61 has one end secured to a bracket 62 axially arranged with respect to disc 56 and mounted thereon in outwardly spaced relation thereto by means of a plurality of legs 63. The other end of rope 61 is positioned in a location convenient to the operator as in the vehicle cab. It will be apparent that, as shown in Figure 4, pulling of the rope 61 will tilt disc 56 and push or reciprocate the hub 47 and reel 46 inwardly along the shaft 45, whereby, with the wheel 2 rotating in an anti-clockwise direction, the clutch roller 43 will engage the right angular face 50 of lug 49 and impart similar rotating movement to the reel. It will also be apparent that, should the vehicle move in a reverse direction in which case the wheel 2 will rotate in a clockwise direction, the clutch roller 43 will ride over the inclined faces 51 of the lugs 49 and thus will not impart such reverse rotation to the reel.

In operation of the parts thus far described, with the apparatus in the position shown in Figure 1, on engagement of the prongs 12 with a bale of hay or the like, the prongs 12 will enter the bale to impale the latter thereon. Thereupon, the operator actuates the clutch by pulling on rope 61 and cable 27 begins an easy and slow winding movement upon portion 53a of ring 53. This initial movement rotates the fork and impaled bale into upright position, the frame 4 remaining in its downward position. Thereafter, further winding movement of the cable 27 swings the frame 4 upwardly about the rotatable mounting of rod 5, carrying with it the loaded fork, as shown in dotted lines in Figure 2. Such swinging movement gradually increases in speed by reason of the eccentric portion 53b of the reel ring 53. When the arms 8 and 9 are in fully upright position, the fork will be directly over the box 3 and, with the prongs 12 directed downwardly, the bale thereon will drop therefrom into the box. Preferably, the last phase of swinging movement of frame 4 into final dumping position is cushioned by means of a leaf spring 64 fixed to mounting bar 6 and engageable by arm 8 as it reaches upright position.

Means are provided to release the clutch when the frame 4 reaches its upright dumping position and the bale is discharged therefrom to permit dropping of the frame and fork back to the position of Figure 1. This is effected by means of a lever 65 pivotally mounted at 66 on disc 48 of the reel and extending perpendicularly through a slot 67 in such disc 48. One end of lever 65 is arranged to engage disc 44 and the other end carries an arm 68 on which is supported a yoke 69 located in radially spaced relation to ring 53 of the reel and closely adjacent to the point of attachment of cable 27 to the ring. Thus, just prior to the completion of one complete winding cycle of cable 27 on ring 53 (such cycle corresponding to the fork rotating and lifting movement described) and at the point where frame 4 is in fully upright position and the load drops from the fork, the cable 27 enters the yoke 69, as shown in Fig. 5, and presses the same inwardly. This movement of the yoke swings lever 65 and causes its end to bear upon disc 44 and forces the reel outwardly therefrom, thus disengaging the clutch. Thereupon, the frame and fork are free to drop, the dropping movement being cushioned by means of a shock absorber 70 having one end pivotally connected to mounting bar 6 and its other end pivotally connected to a crank 71 pivotally mounted on arm 8. It will be apparent that the purpose of crank 71 is to permit a rapid fall of the frame and fork until it is near the ground, when the shock absorber 70 acts to ease the fork to the ground. Since bales are sometimes close together, a fast fall of the fork is necessary to reduce the time of a cycle. A stabilizing spring 72 also preferably connects bar 6 and arm 8.

A cable tightener is preferably provided and, as shown, comprises an arm 73 pivotally carried at one end by arm 35 and carrying a pair of rollers 74 at its other end through which the cable 27 extends. A spring 75 exerts pressure on the arm 73 to impose a slack take-up on the cable 27.

What I claim is:

1. Loading apparatus for a vehicle having a load-receiving box and a driving wheel comprising a frame, means for swingably mounting said frame on the vehicle, a fork rotatably carried in said frame, a fork rotating member fixed to the fork, a pair of stops carried by said member and defining the rotative limits of said fork, stop engaging means carried by the frame, a spring connected to said member and urging said fork in one direction of rotation for placing one of said stops in engagement with said stop engaging means, a reel mounting bracket for attachment to said wheel, a reel mounted on said bracket, clutch mechanism arranged to drivably connect said reel and bracket, a cable having one end connected to said member and its other end connected to said reel, said cable having intermediate engagement with said frame, manually operable means for actuating said clutch mechanism, said reel being rotatable to wind said cable thereon in response to actuation to said clutch mechanism, said cable, in response to initial winding movement, imparting rotative movement in the other direction to said member and fork to place the other of said stops in engagement with said stop engaging means, said cable in response to subsequent winding movement imparting swinging movement to said fork and frame, and means carried by said reel and operable by said cable for releasing said clutch mechanism.

2. Loading apparatus as defined in claim 1, said reel having a substantially oval ring eccentrically positioned therein and constituting the winding surface for said cable, the portion of said ring initially engageable by said cable being equidistantly spaced from the axis of said reel to provide a relatively slow motion of said initial winding movement, the portion of said ring subsequently engageable by said cable being spaced a gradually increasing distance from said axis to provide a relatively rapid motion of said subsequent winding movement, one cycle of said initial and subsequent winding movements corresponding to one substantially complete loop of said cable on said ring.

3. Loading apparatus as defined in claim 1, said reel having a substantially oval ring eccentrically positioned therein and constituting the winding surface for said cable, the portion of said ring initially engageable by said cable being equidistantly spaced from the axis of said reel to provide a relatively slow motion of said initial winding movement, the portion of said ring subsequently engageable by said cable being spaced a gradually increasing distance from said axis to provide a relatively rapid motion of said subsequent winding movement, one cycle of said initial and subsequent winding movements corresponding to one substantially complete loop of said cable on said ring, said clutch mechanism releasing means comprising a yoke engageable by said cable at the termination of said subsequent winding movement.

4. Loading apparatus for a vehicle having a load-receiving box and a driving wheel comprising mounting bars for attachment to said box, a frame rotatably mounted on said bars, said frame having an arm substantially laterally aligned with one of said bars, a shaft fixed to the free end of said arm, a fork rotatably mounted on said shaft, a fork rotating member fixed to the fork, a pair of stops carried by said member and defining the rotative limits of said fork, stop engaging means carried by the frame, a spring connected to said member and urging said fork in one direction of rotation for placing one of said stops in engagement with said stop engaging means, a reel mounting bracket for attachment to said wheel, a reel mounted on said bracket, clutch mechanism arranged to drivably connect said reel and bracket, a cable having one end connected to said member and its other end connected to said reel, pulleys carried by said arm and said one bar engaging said cable intermediate its ends, manually operable means for actuating said clutch mechanism, said reel being rotatable to wind said cable thereon in response to actuation of said clutch mechanism, said cable in response to initial winding movement imparting rotative movement in the other direction to said member and fork to place the other of said stops in engagement with said stop engaging means, said cable in response to subsequent winding movement imparting swinging movement to said fork and frame, and means carried by said reel and engageable by said cable for releasing said clutch mechanism.

References Cited in the file of this patent

UNITED STATES PATENTS

| | | |
|---|---|---|
| 1,327,834 | Long | Jan. 13, 1920 |
| 1,682,352 | Shanks | Aug. 28, 1928 |
| 2,388,015 | Shoemaker | Oct. 30, 1945 |
| 2,407,930 | LaPointe | Sept. 17, 1946 |